United States Patent
Prebble

(10) Patent No.: US 12,293,143 B2
(45) Date of Patent: May 6, 2025

(54) DETECTION AND TAGGING OF PARAGRAPHS SPANNING COLUMNS, PAGES, OR OTHER READING UNITS

(71) Applicant: KONICA MINOLTA BUSINESS SOLUTIONS U.S.A., INC., Foster City, CA (US)

(72) Inventor: Tim Prebble, Longmont, CO (US)

(73) Assignee: KONICA MINOLTA BUSINESS SOLUTIONS U.S.A., INC., Foster City, CA (US)

(*) Notice: Subject to any disclaimer, the term of this patent is extended or adjusted under 35 U.S.C. 154(b) by 0 days.

(21) Appl. No.: 17/957,267

(22) Filed: Sep. 30, 2022

(65) Prior Publication Data

US 2024/0111942 A1    Apr. 4, 2024

(51) Int. Cl.
  *G06V 30/414*  (2022.01)
  *G06F 40/103*  (2020.01)
  *G06F 40/106*  (2020.01)
  *G06F 40/117*  (2020.01)

(52) U.S. Cl.
  CPC .......... *G06F 40/117* (2020.01); *G06F 40/103* (2020.01); *G06F 40/106* (2020.01); *G06V 30/414* (2022.01)

(58) Field of Classification Search
  CPC .... G06F 40/117; G06F 40/103; G06V 30/414
  See application file for complete search history.

(56) References Cited

U.S. PATENT DOCUMENTS

| | | | |
|---|---|---|---|
| 6,175,844 B1* | 1/2001 | Stolin | G06V 30/414 715/210 |
| 7,272,789 B2 | 9/2007 | O'Brien | |
| 7,899,249 B2* | 3/2011 | Furmaniak | G06V 30/416 382/176 |
| 8,196,030 B1 | 6/2012 | Wang et al. | |
| 8,249,356 B1* | 8/2012 | Smith | G06V 30/414 382/199 |
| 8,380,753 B2* | 2/2013 | Mansfield | G06F 40/137 707/791 |

(Continued)

FOREIGN PATENT DOCUMENTS

| | | | | |
|---|---|---|---|---|
| CN | 112307718 A | * | 2/2021 | ............. G06F 16/86 |
| CN | 116665236 A | * | 8/2023 | |

(Continued)

OTHER PUBLICATIONS

Nukefactory, "Fix widows, orphans, and runts in Adobe InDesign", Aug. 20, 2021, 15 pages, https://nukefactory.com/tutorials/widows-orphans-and-runts/ (Year: 2021).*

*Primary Examiner* — Benjamin Smith
(74) *Attorney, Agent, or Firm* — SQUIRE PATTON BOGGS (US) LLP

(57) ABSTRACT

Systems, methods, apparatuses, and computer program products for detecting and tagging of paragraphs that span columns, pages, or other reading units are provided. For example, a method can include obtaining a set of candidate paragraphs for a document. The method can also include identifying a pair of candidate paragraphs spanning columns from among the set of candidate paragraphs. The method can further include outputting a tagged paragraph corresponding to the pair of candidate paragraphs spanning columns.

9 Claims, 12 Drawing Sheets

(56) References Cited

U.S. PATENT DOCUMENTS

| | | | | |
|---|---|---|---|---|
| 8,539,342 | B1* | 9/2013 | Lewis | G06F 40/131 |
| | | | | 715/251 |
| 8,565,474 | B2* | 10/2013 | Radakovic | G06V 30/414 |
| | | | | 382/175 |
| 8,782,516 | B1* | 7/2014 | Dozier | G06F 40/117 |
| | | | | 715/236 |
| 8,832,549 | B2* | 9/2014 | Mansfield | G06F 40/143 |
| | | | | 715/251 |
| 9,098,471 | B2 | 8/2015 | Richardson et al. | |
| 9,116,865 | B2 | 8/2015 | Le Chevalier et al. | |
| 9,658,991 | B2* | 5/2017 | Bruno | G06F 40/151 |
| 9,811,727 | B2* | 11/2017 | Koh | G06V 30/416 |
| 9,842,251 | B2* | 12/2017 | Grams | G06F 40/174 |
| 9,852,132 | B2 | 12/2017 | Chhichhia et al. | |
| 9,959,259 | B2 | 5/2018 | Mansfield, III et al. | |
| 10,068,380 | B2* | 9/2018 | Chang | G06F 40/10 |
| 10,360,294 | B2* | 7/2019 | Phillips | G06F 16/353 |
| 10,372,821 | B2* | 8/2019 | Chang | G06F 40/114 |
| 10,387,034 | B2* | 8/2019 | Lee | G06V 30/32 |
| 10,423,828 | B2* | 9/2019 | Sodhani | G06N 3/044 |
| 10,599,924 | B2* | 3/2020 | Yang | G06V 30/414 |
| 10,606,933 | B2* | 3/2020 | Breuel | G06F 40/131 |
| 10,621,428 | B1* | 4/2020 | Cai | G06T 7/11 |
| 10,691,936 | B2* | 6/2020 | Bellert | G06F 16/93 |
| 10,713,519 | B2* | 7/2020 | Bui | G06Q 10/06 |
| 10,878,173 | B2* | 12/2020 | Morariu | G06V 30/19173 |
| 10,878,587 | B2* | 12/2020 | Edge | G06T 7/33 |
| 11,086,515 | B2* | 8/2021 | Lee | G06F 3/04886 |
| 11,314,969 | B2 | 4/2022 | Yang et al. | |
| 11,455,762 | B2* | 9/2022 | Aggarwal | G06T 7/74 |
| 2004/0205568 | A1* | 10/2004 | Breuel | G06F 40/166 |
| | | | | 715/205 |
| 2008/0107338 | A1* | 5/2008 | Furmaniak | G06V 30/416 |
| | | | | 382/176 |
| 2011/0222773 | A1* | 9/2011 | Radakovic | G06V 30/416 |
| | | | | 382/224 |
| 2011/0289395 | A1* | 11/2011 | Breuel | G06F 40/151 |
| | | | | 715/205 |
| 2012/0185491 | A1* | 7/2012 | Mansfield | G06F 16/00 |
| | | | | 707/E17.058 |
| 2013/0174024 | A1* | 7/2013 | Xing | G06F 40/103 |
| | | | | 715/249 |
| 2013/0191732 | A1* | 7/2013 | Lazarevic | G06V 30/414 |
| | | | | 715/249 |
| 2013/0227406 | A1* | 8/2013 | Mansfield | G06F 40/137 |
| | | | | 715/270 |
| 2013/0283152 | A1* | 10/2013 | Venkata | G06F 40/103 |
| | | | | 715/244 |
| 2014/0013215 | A1* | 1/2014 | Sesum | G06V 30/414 |
| | | | | 715/247 |
| 2014/0298164 | A1* | 10/2014 | Terayoko | G06F 40/103 |
| | | | | 715/243 |
| 2014/0301644 | A1* | 10/2014 | Koh | G06V 30/416 |
| | | | | 382/175 |
| 2015/0095022 | A1* | 4/2015 | Xu | G06V 30/416 |
| | | | | 704/10 |
| 2015/0095769 | A1* | 4/2015 | Zhang | G06V 30/413 |
| | | | | 715/243 |
| 2016/0085731 | A1* | 3/2016 | Bruno | G06F 40/134 |
| | | | | 715/205 |
| 2016/0147434 | A1* | 5/2016 | Lee | G06F 3/0482 |
| | | | | 715/838 |
| 2016/0314104 | A1* | 10/2016 | Phillips | G06F 40/151 |
| 2017/0220859 | A1* | 8/2017 | Grams | H04N 1/387 |
| 2018/0137681 | A1* | 5/2018 | Chang | G06F 40/10 |
| 2018/0267956 | A1* | 9/2018 | Chang | G06F 40/114 |
| 2018/0373952 | A1* | 12/2018 | Bui | G06V 30/153 |
| 2018/0374225 | A1* | 12/2018 | Edge | G06F 40/106 |
| 2019/0026550 | A1* | 1/2019 | Yang | G06V 30/19147 |
| 2019/0147010 | A1 | 5/2019 | Musuluri | |
| 2019/0188463 | A1* | 6/2019 | Sodhani | G06V 10/82 |
| 2019/0188887 | A1* | 6/2019 | Aggarwal | G06V 30/245 |
| 2019/0205362 | A1 | 7/2019 | Prebble | |
| 2020/0005033 | A1* | 1/2020 | Bellert | G06F 16/93 |
| 2020/0175095 | A1* | 6/2020 | Morariu | G06N 3/045 |
| 2022/0318224 | A1* | 10/2022 | Thompson | G06V 10/70 |
| 2023/0045858 | A1* | 2/2023 | Aggarwal | G06F 40/109 |
| 2023/0281379 | A1* | 9/2023 | Jain | G06F 40/106 |
| | | | | 715/244 |

FOREIGN PATENT DOCUMENTS

| | | | | |
|---|---|---|---|---|
| JP | 2012164305 A | * | 8/2012 | G06F 16/00 |
| WO | WO-2018161764 A1 | * | 9/2018 | G06K 9/00 |

* cited by examiner

DETECTION AND TAGGING OF PARAGRAPHS SPANNING COLUMNS, PAGES, OR OTHER READING UNITS

FIELD

Some example embodiments may generally relate to document processing. For example, certain example embodiments may generally relate to detecting and tagging of paragraphs that span columns, pages, or other reading units.

BACKGROUND

Document processing may involve characterizing units of information according to their semantic and/or syntactic relationships. For example, ink on a page may be interpreted at a first semantic level as characters or other symbols or as photos or the like. Characters may be interpreted as components of words, words may be interpreted as sentences, and sentences may be interpreted as parts of paragraphs. Kerning, spacing, and other typesetting techniques can be used to convey the logical relationship between clusters of characters. Accurate interpretation of the logical relationship amongst characters may aid in machine interpretation of the characters, not only for machine reading, but also for automatic adjustment of typesetting from one format to another format.

SUMMARY

An embodiment of the present invention may be directed to a method that includes obtaining a set of candidate paragraphs for a document. The method also includes identifying a pair of candidate paragraphs spanning columns from among the set of candidate paragraphs. The method further includes outputting a tagged paragraph corresponding to the pair of candidate paragraphs spanning columns.

An embodiment of the present invention may be directed to an apparatus that includes at least one processor and at least one memory including computer program code. The at least one memory and the computer program code are configured to, with the at least one processor, cause the apparatus to perform obtaining a set of candidate paragraphs for a document, identifying a pair of candidate paragraphs spanning columns from among the set of candidate paragraphs, and outputting a tagged paragraph corresponding to the pair of candidate paragraphs spanning columns.

An embodiment of the present invention may be directed to a non-transitory computer-readable medium encoded with instructions that, when executed in hardware, perform a process. The process includes obtaining a set of candidate paragraphs for a document. The process also includes identifying a pair of candidate paragraphs spanning columns from among the set of candidate paragraphs. The process further includes outputting a tagged paragraph corresponding to the pair of candidate paragraphs spanning columns.

BRIEF DESCRIPTION OF THE DRAWINGS

For proper understanding of example embodiments, reference should be made to the accompanying drawings, wherein.

DETAILED DESCRIPTION

Figure 1:
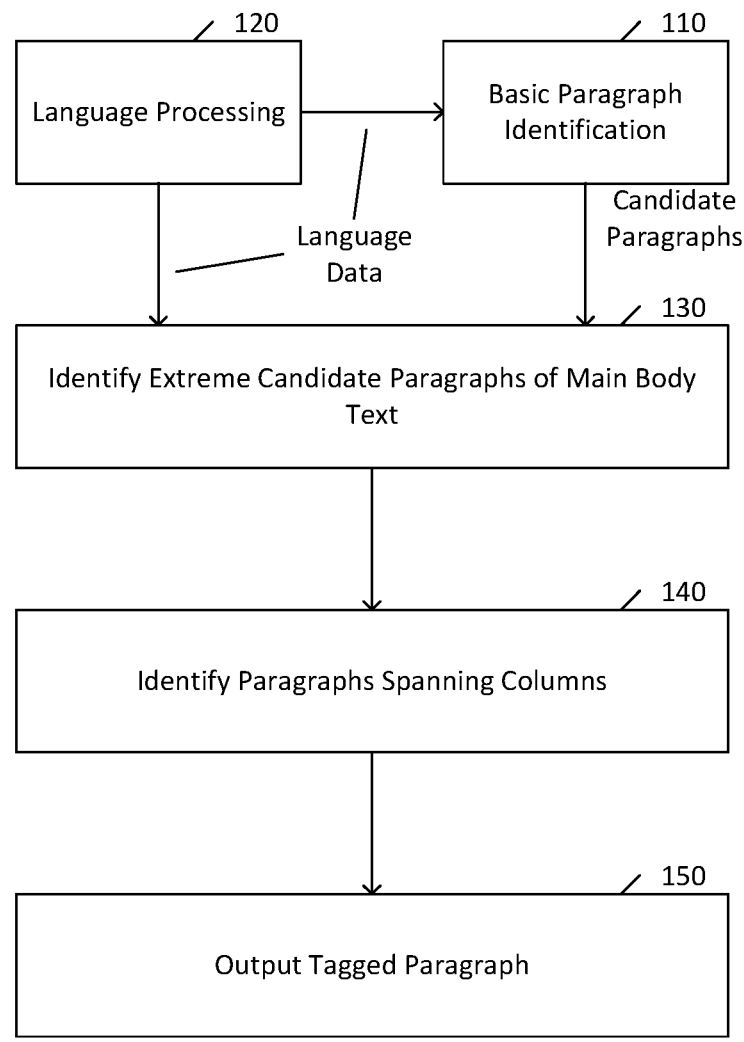
FIG. 1 illustrates a method according to certain embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for detecting and tagging of paragraphs that span columns, pages, or other reading units, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments relate to a method for identifying paragraphs that span columns, whether spanning columns on a single page or on related columns of different pages. Certain embodiments may provide improved grouping of text into paragraphs.

Document analytics and similar fields aim to extract information from electronic documents. Such documents may be in a format such as portable document format (PDF), or may be in the form of scans or renderings of document pages. In such cases, the information provided in the document itself may be inadequate, requiring additional information to be inferred. For example, if the document is formed of electronic scans, optical character recognition (OCR) can be performed to extract the textual information such as character codes and positions. If the document is a PDF file, the fundamental textual information, such as character codes and positions, may be present in the document itself, but higher-level textual information, such as the explicit grouping of characters into paragraphs and columns, is missing. In each case, if higher-level information is desired, such higher-level information must be inferred.

FIG. 1 illustrates a method according to certain embodiments. As shown in FIG. 1, at 110, basic paragraph identification may be performed. The output of the basic paragraph identification at 110 may be an initial set of candidate paragraphs. Additional inferencing may still be needed to identify those candidate paragraphs that jointly form a single paragraph.

Certain embodiments provide a method for identifying candidate paragraphs that constitute parts of single paragraphs, which span pages, columns, or both.

For example, given a page with text divided into two columns, the candidate paragraph at the end of the first column, and the candidate paragraph at the start of the second column, might actually be two parts of a single paragraph. Likewise, the candidate paragraph at the end of the page might actually be a part of the same paragraph as the candidate paragraph at the start of the next page.

Basic paragraph identification may not identify split paragraphs as single paragraphs, because basic paragraph identification process at 110 may identify paragraphs by finding clusters of text lines that seem to form discrete groups. Thus, certain embodiments may provide additional processing of candidate paragraphs after basic paragraph identification has been made.

Certain embodiments may provide various benefits and/or advantages. For example, certain embodiments may identify paragraphs that span page and column boundaries. Accurate knowledge of true paragraphs, regardless of layout considerations, may be useful for document reconstruction, editing, and analysis.

As mentioned above, basic paragraph identification at 110 can provide sets of candidate paragraphs (CPs), one set per page. This is one example of the way that candidate paragraphs can be provided. The candidate paragraphs can take into account language processing at 120, such as natural language processing. In this discussion, English language documents are used as an example. The same approaches may be used with other languages that have similar characteristics, in terms of using paragraphs, being presentable in columns with paragraphs spanning column breaks, and the like. While English is normally read left to right and then top to bottom within a given column, other languages, such as Hebrew and Arabic, use different conventions. Some languages have flexible conventions and can be written from top to bottom and then right to left, or in other ways. Thus, the example based on English and similar languages may also be applied appropriately to other languages.

For the purpose of discussion, the text is analyzed in normal reading orientation, rather than some other orientation, such as the print negative orientation or the like. Basic paragraph identification 110 may be performed using optical character recognition that may involve determining the orientation of the writing and aligning the page so that the candidate paragraphs would be read from left to right and then top to bottom.

For a given page, it is possible that basic paragraph identification at 110 may yield a null or empty set, which can be interpreted as the page containing no paragraphs.

Any desired method can be used to generate the CPs. As an example, such a method could entail finding clusters of text lines that seem to form discrete groups, and labeling each cluster as a CP. Regardless of the method used, the output of basic paragraph identification may fail to identify paragraphs that span pages or columns as single CPs. Instead, basic paragraph identification may label such single paragraphs as multiple CPs, where each discrete portion of the actual paragraph corresponds to a single CP. For example, if a paragraph actually spans a column boundary, starting in column A and ending in column B, then the portion in A may be identified as one CP and the portion in column B may be identified as another CP.

At 130, the method can include identifying the extreme CPs. More specifically, the method can include identifying the subset of CPs that likely form portions of the topmost or bottommost extents of main body text (MBT). MBT can be the text in the main area of the page. For example, the main area of the page can the portion of the page that excludes header, footer, and margins. The main area of the page may also exclude text that is contained by, for example, a table, textbox, or callout.

Figure 2:
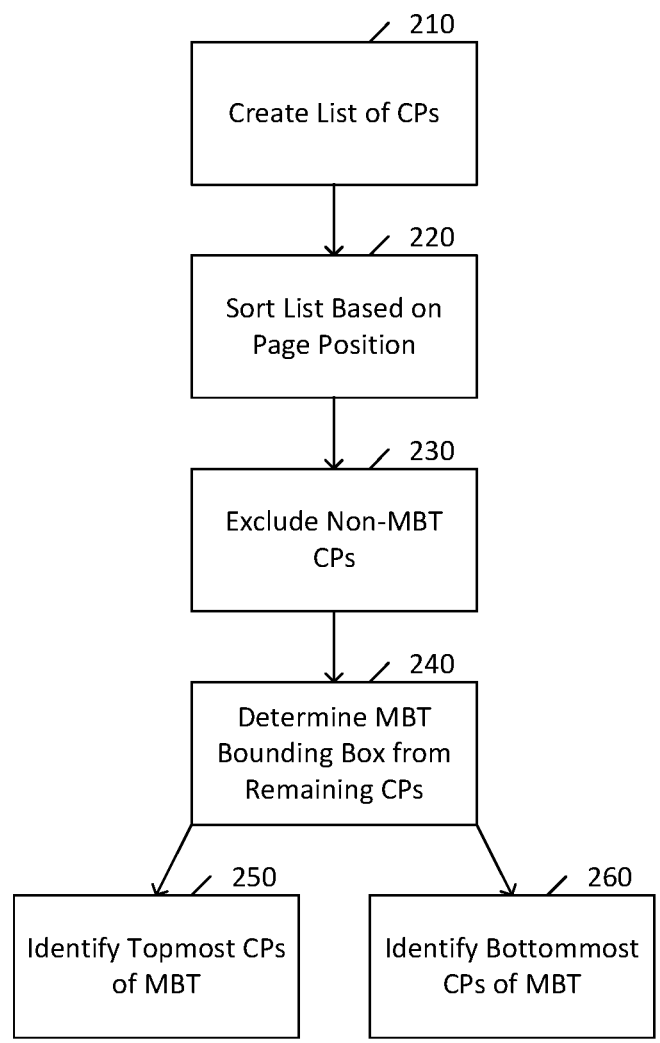
FIG. 2 illustrates a process of obtaining extreme CPs within the main body text, according to certain embodiments.

There are various ways that the extreme CPs can be identified. The following is an example of a routine that could be followed. FIG. 2 illustrates a process of obtaining extreme CPs within the main body text.

For each page, the system may create a list of CPs at 210. Data regarding the CPs can include a bounding box for each CP. The CPs can be sorted at 220 from top of the page to bottom of the page, considering the top of each CP's bounding box. If any CPs do not appear to be MBT, they can be removed from the list of CPs at 230. There is further discussion regarding this aspect below.

At 240, the method can include finding a union of the bounding boxes of the remaining CPs after the exclusion of the non-MBT CPs. This is the bounding box of the MBT.

At 250, the method can include identifying the CPs that form the topmost MBT. A given page can be viewed as having x values from left to right and y values from bottom to top. For any X-value on the page, there may be either zero or one, but never more than one, CP identified as the topmost CP of the MBT. Other labelling conventions can also be used. For example, the origin can be the upper left of the page, with x values increasing to the right and y values increasing toward the bottom. The labelling convention used in these examples is not limiting, but merely illustrative of the principles described herein.

Figure 3:
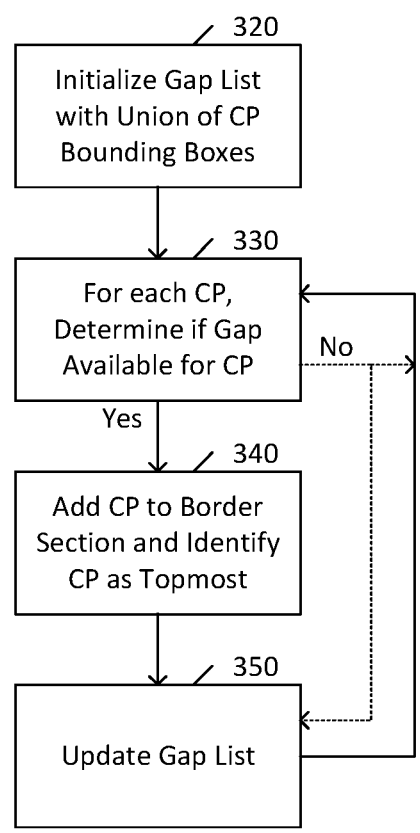
FIG. 3 illustrates a method of identifying the topmost candidate paragraphs of a page, according to certain embodiments.

FIG. 3 illustrates a method of identifying the topmost candidate paragraphs of a page, according to certain embodiments. At 320, a list of gaps can be initialized as a gap with a range of x-values corresponding to a union of bounding boxes of all candidate paragraphs that are main body text.

The border can be considered as a list of border sections made up of the CPs that define the border, and a list of gaps.

A gap can be a pair of x-values with a left value as the start of the gap and right value as the end of the gap. In the initializing at 320 the list of border sections can be empty and the list of gaps can be a single gap, which can correspond to the union of CP bounding boxes.

For each CP, from topmost to bottommost, the method can include, at 330, determining whether there is a gap large enough for the entire CP to fit. In the case of the first CP, there will necessarily always be a big enough gap, because no CP can be bigger than the entire MBT bounding box. In the case of a page with only a single column of text, the first CP may fill the entire border, leaving no gaps. In the case of a page with 6 columns, the first CP may fill a little less than ⅙ of the border.

If there is currently a gap available for the CP, then at 340, the method can include adding the current CP to the list of border sections, and identify the current CP as a part of the topmost MBT. If an available gap was not required, it is possible that a border could contain CPs that overlap in X.

At 350, the method can include updating the list of gaps. For example, the x range of the CP can be removed from the gap list whether or not the CP was added to the border section.

Figure 4:
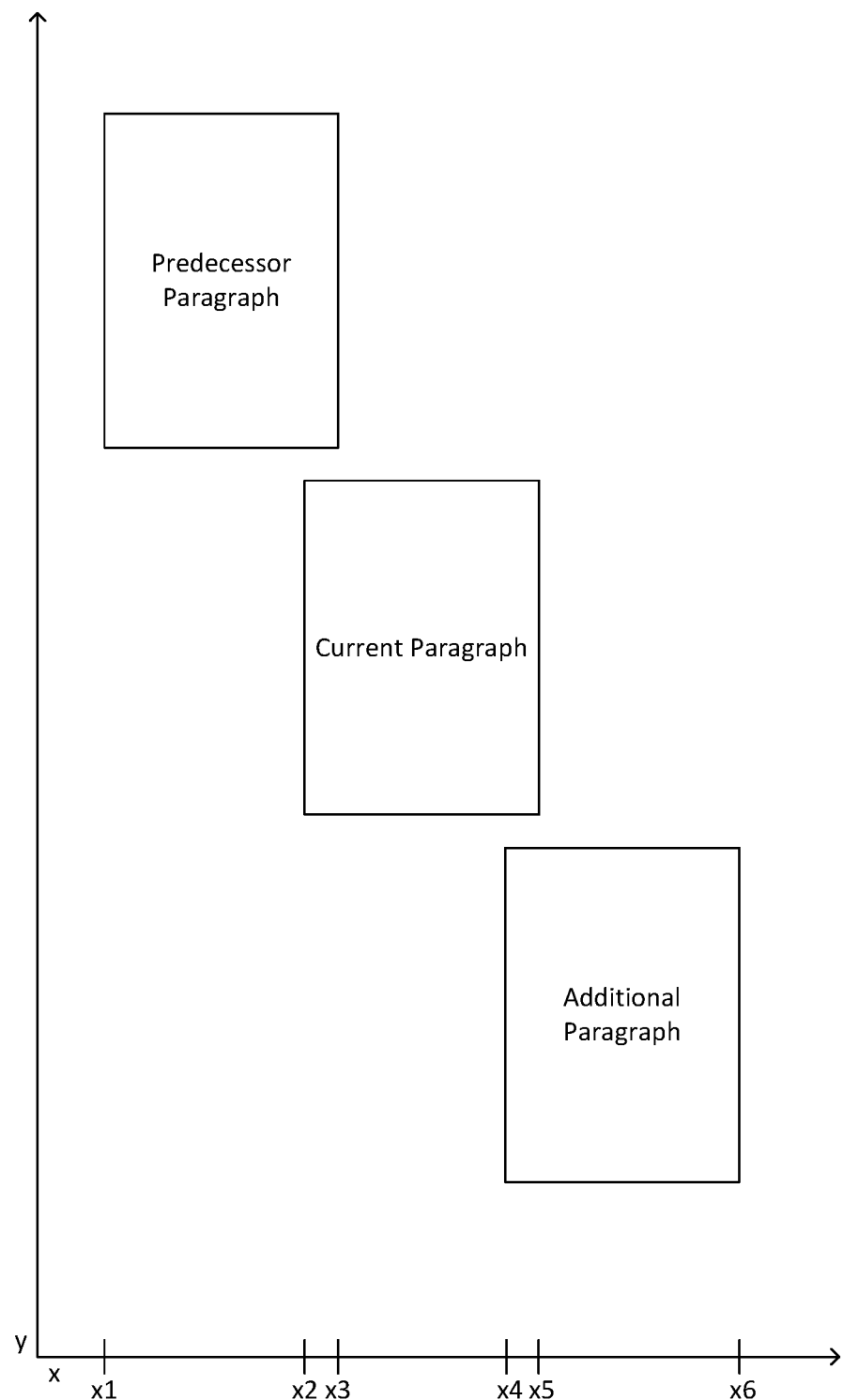
FIG. 4 illustrates an example of paragraphs with horizontal overlap, according to certain embodiments.

FIG. 4 illustrates an example of paragraphs with horizontal overlap, according to certain embodiments. As shown in FIG. 4, the x range of a predecessor paragraph may be from x1 to x3. Subsequently, the current paragraph may be considered in the method of FIG. 3. In this case, the range from x2 to x3 would not be available at the top border. Accordingly, the current paragraph may not be considered one of the topmost CPs. In one option, the range from x3 to x5 may be maintained as a gap at the border. In another embodiment, the range from x3 to x5 may be removed from the gap list. The difference between these approaches may be noticed when considering an additional paragraph that ranges from x4 to x6. If x3 to x5 has been removed from the gap list, then when the additional paragraph with a range from x4 to x6 is considered, the additional paragraph will not be identified as a topmost paragraph. Otherwise, if x3 to x5 is still part of the gap list, then the additional paragraph may be considered a topmost paragraph.

As shown in FIG. 3, the gap list can be updated 350 after consideration of a current CP. The updating can involve adjusting gap geometry, splitting single gaps into multiple gaps, and completely removing gaps. For example, if the current paragraph shown in FIG. 4 were not present, then the update upon adding the additional paragraph to the topmost list may be to split an existing gap from x3 to the maximum value of x for the page, into a gap from x3 to x4 and a gap from x6 to the maximum value of x for the page. In another example, if the current paragraph shown in FIG. 4 is present and if x6 is the maximum value of x for the page, after consideration of the additional paragraph, the gap may be completely removed. The procedure may terminate when there is no gap left. Alternatively, the procedure may continue until all candidate paragraphs on a page have been considered. As the number of candidate paragraphs on a page may be less than 100 in most cases, there may be little waste from considering candidate paragraphs even if there is no remaining gap.

Returning to the method of FIG. 2, the method can also include, at 260, identifying the CPs forming the bottommost MBT. This process can be analogous to that set forth above for identifying the CPs forming the topmost MBT. In the case of considering the bottommost paragraphs, the list of candidate paragraphs may sorted from bottom to top, considering each CP's bottom side.

Figure 5:
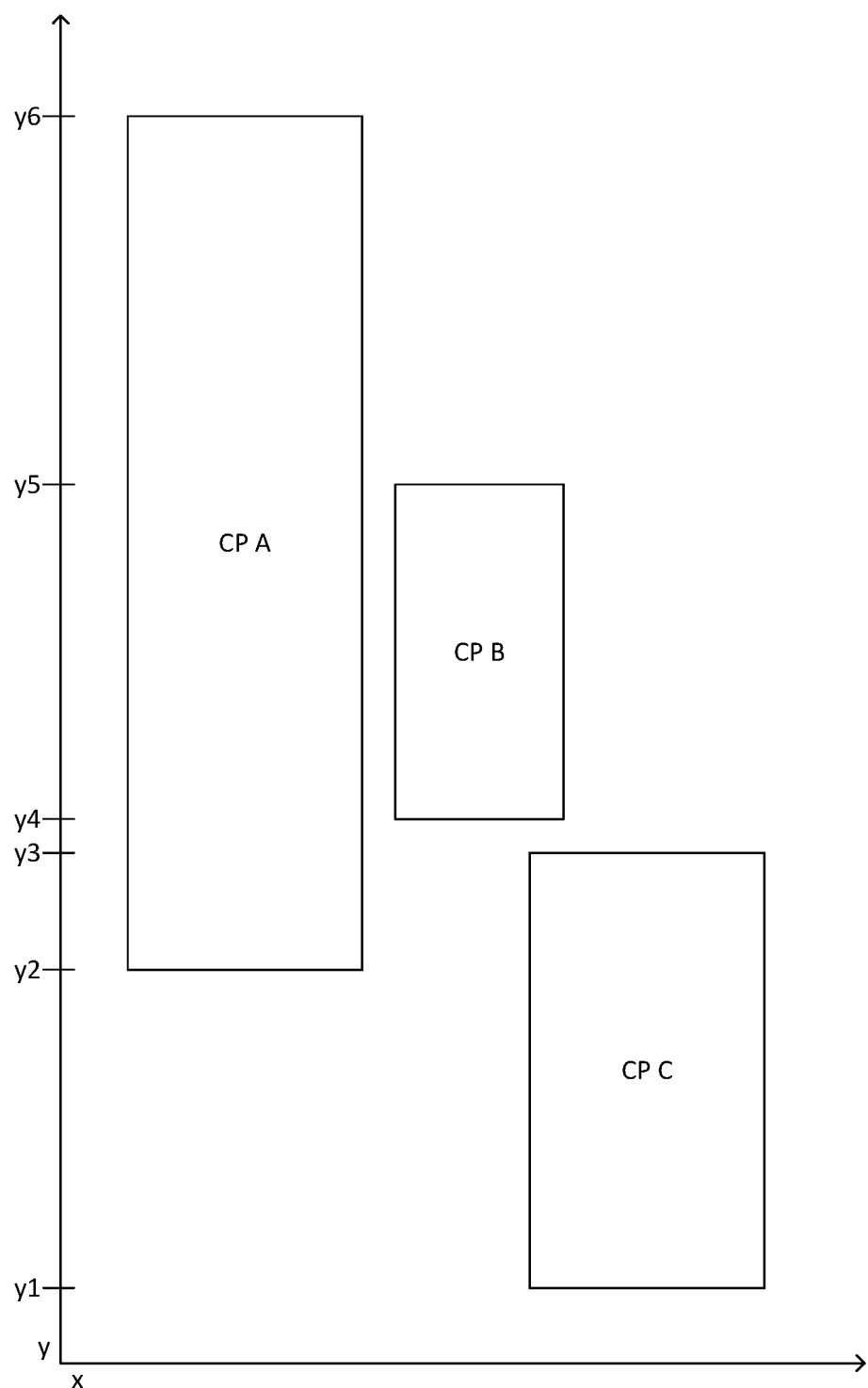
FIG. 5 illustrates vertical positioning of candidate paragraphs according to certain embodiments.

FIG. 5 illustrates vertical positioning of candidate paragraphs according to certain embodiments. As shown in FIG. 5, there may be three candidate paragraphs on a page, CP A, CP B, and CP C. When the method of FIG. 2 and FIG. 3 is applied to the candidate paragraphs shown in FIG. 5, the list of candidate paragraphs may be sorted from top to bottom as CP A, CP B, and CP C. This may be because CP A has a topmost edge at y6, which is higher than the topmost edge of CP B, namely y5, and then the topmost edge of CP C, namely y3. By contrast, when looking for the bottommost paragraphs, the method of FIG. 2 may sort the candidate paragraphs as CP C, CP A, and CP B, because the bottommost edge of CP C has the lowest value of y, y1, and the lowest edge of CP A has a y value, y2, which is lower than the bottommost edge of CP B, y4. Accordingly, the paragraphs would not necessarily be considered in an opposite order from the procedure for looking for the topmost paragraphs.

The method of FIG. 1 can include, at 140, identifying paragraphs spanning columns. There may be various ways to identify paragraphs that span columns. As mentioned above, certain embodiments can be configured according to the conventions of the English language. Thus, for example, a candidate paragraph on a single column page may span from the bottom of a given page to a top of the next page. As another example, a candidate paragraph at the bottom of a given column of a multi-column page can span to the top of a next column of the page.

Upon identifying the paragraphs spanning columns at 140, broadly including paragraphs spanning pages, the method can include, at 150, outputting a tagged paragraph made of at least two candidate paragraphs.

Figure 6:
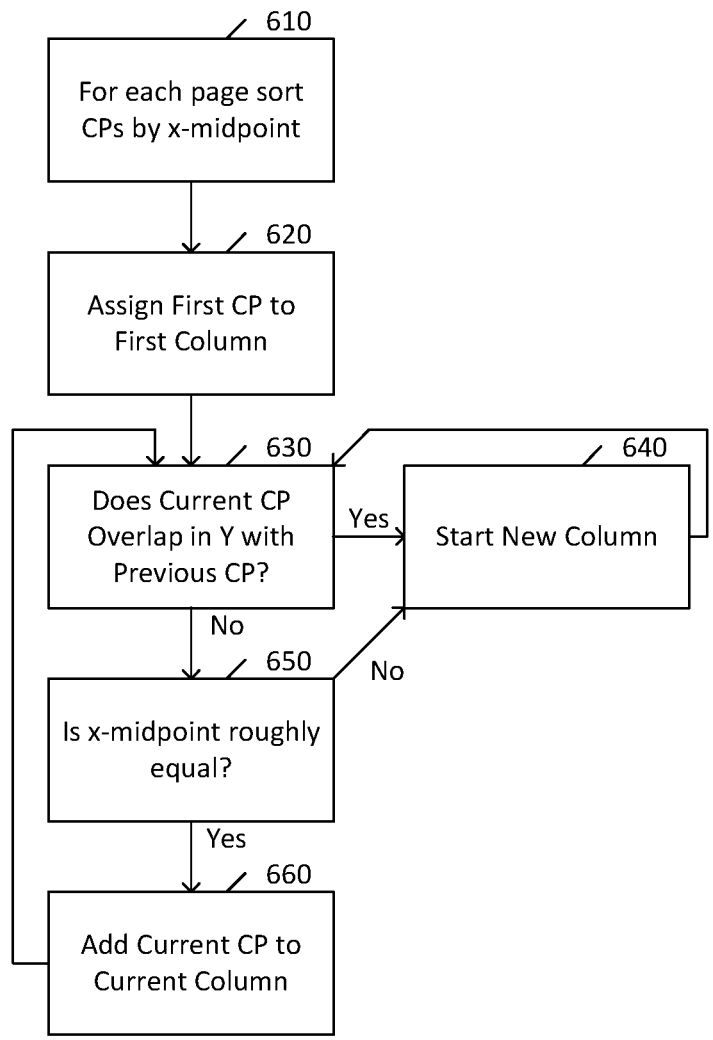
FIG. 6 illustrates a method of identifying columns according to certain embodiments.

Identifying the spanning can be performed in numerous ways. FIG. 6 illustrates a method of identifying spanning columns according to certain embodiments. At 610, for each page, each CP of the CPs on a given page, can be sorted by x-midpoint. Non-MBT CPs, such as material from footnotes, margins, or headers, can be excluded from consideration.

Figure 7:
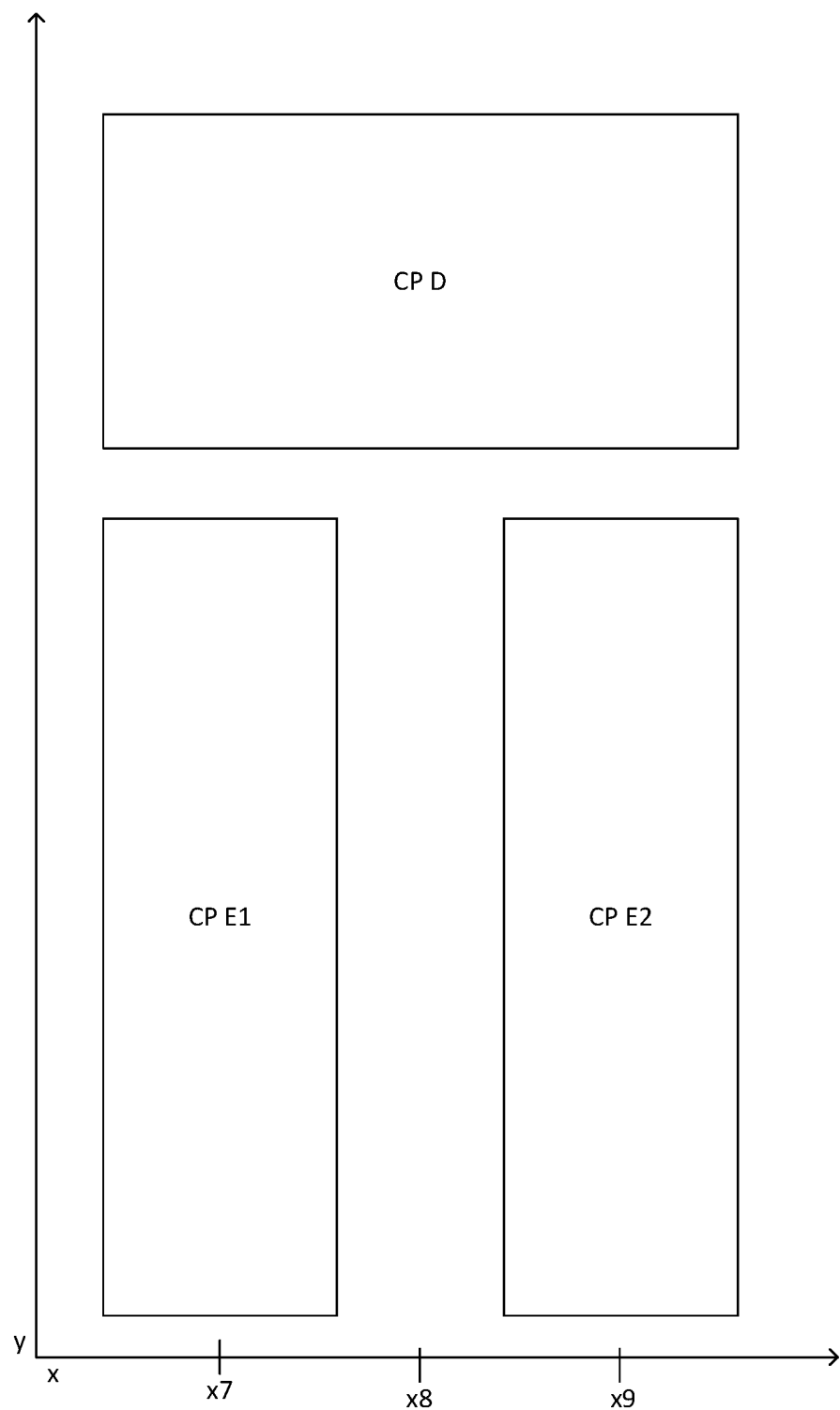
FIG. 7 illustrates candidate paragraphs having distinct midpoints, according to certain embodiments.

FIG. 7 illustrates candidate paragraphs having distinct midpoints, according to certain embodiments. As shown in FIG. 7, if the CPs shown were sorted according to x-midpoint as at 610 in FIG. 6, then result would be CP E1, CP D, CP E2, which respectively have x-midpoints x7, x8, and x9. In practice, the arrangement of FIG. 7, may reflect a single column format in CP D, and then a dual column format that includes CP E1 and CP E2. In practice, there may two or more paragraphs rather than a single candidate CP D, each with a shorter size in the vertical direction but approximately the same width. Likewise, CP E1 and CP E2 may instead be multiple narrow candidate paragraphs, rather than a single large candidate paragraph.

The candidate paragraphs in the space shown as CP E1 may have approximately the same x-midpoint as one another. By contrast, the candidate paragraphs in the space shown as CP D may have approximately the same x-midpoint as one another, but a noticeably different midpoint from those in CP E1 or CP E2.

As shown in FIG. 6, for each page, the first candidate paragraph can be assigned to a first column at 620. Then, at 630, for the next CP and each subsequent CP, the method can include determining whether a current CP overlaps in the Y direction with the previous CP. In the example of FIG. 5, CP B overlaps in the Y direction with CP A. Likewise, CP C overlaps in the Y direction with CP A. However, in FIG. 5, CP B and CP C do not overlap with one another in the Y direction.

As shown in FIG. 6, at 650, the method can include determining whether the x-midpoint of the current CP is roughly equal to the preceding CP. Rough equality can be determined by using, for example, a threshold. The threshold may be expressed in absolute terms, such as a number of points or pixels, or in relative terms, such as a certain percentage of the width of the CP, for example 10% of the width of the CP or current column. In FIG. 7, the x-midpoints of CP E1, CP E2, and CP D would all not be roughly equal with one another.

In case the current CP overlaps in Y or its x-midpoint is not roughly equal to that of the preceding CP, then at 640, a new column can be started and the CP can be assigned to the new column.

If the current CP does not overlap in Y with its predecessor, and if the current CP's X-midpoint is roughly equal to that of its predecessor, then at 660 the method can include adding the current CP to the current column, namely the same column as the predecessor CP.

The column width can be updated as CPs are added to the column. The column width may either stay constant or expand as the column is added to. Wider columns may allow for greater variance of CP widths, and narrower columns may allow for less variance of CP widths.

Figure 8:
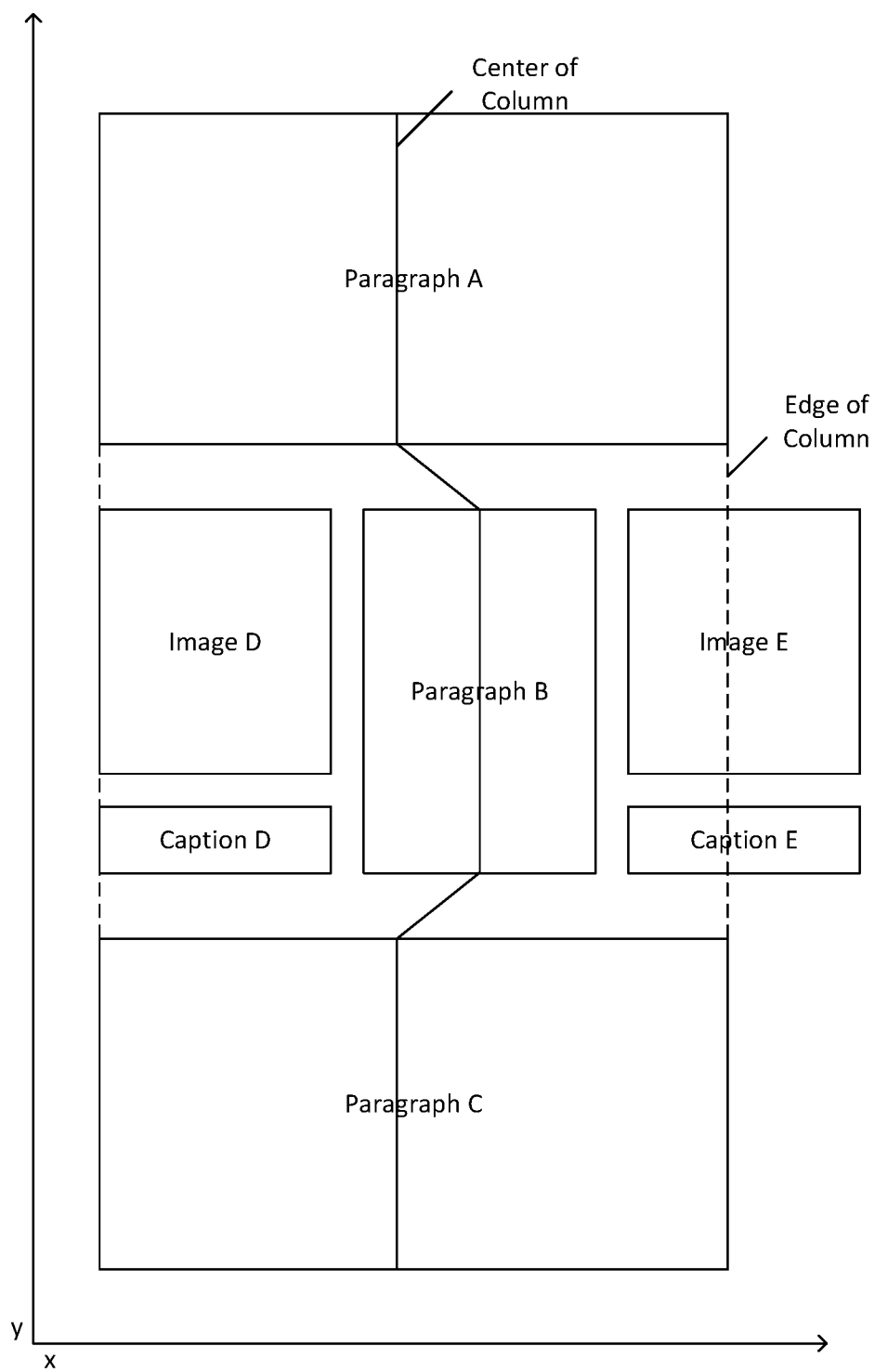
FIG. 8 illustrates a situation with uneven paragraphs in a column, according to certain embodiments.

Rough equality, rather than exact equality, may be used because the widths of paragraphs that share a column may not be perfectly consistent. Additionally, another reason for the use of rough equality is related to the reason for considering the X-midpoint, rather than some other aspect of the CP bounding boxes. FIG. 8 illustrates a situation with uneven paragraphs in a column, according to certain embodiments. Having roughly equal X-midpoints may be a good predictor of whether two paragraphs belong in the same column, even in situations like those shown below, where paragraph geometry is affected by the presence of surrounding objects, and where paragraphs that do not belong in the column may lie within the edges of the column.

In the example of FIG. 8, the center of the column may run through paragraphs A, B, and C, whereas images D and E and captions D and E may not be part of the column of text. While the x-midpoint of paragraph B may create a slight divergence in the center of the column, the x-midpoints of caption D or caption E would create a much bigger divergence.

Figure 9:
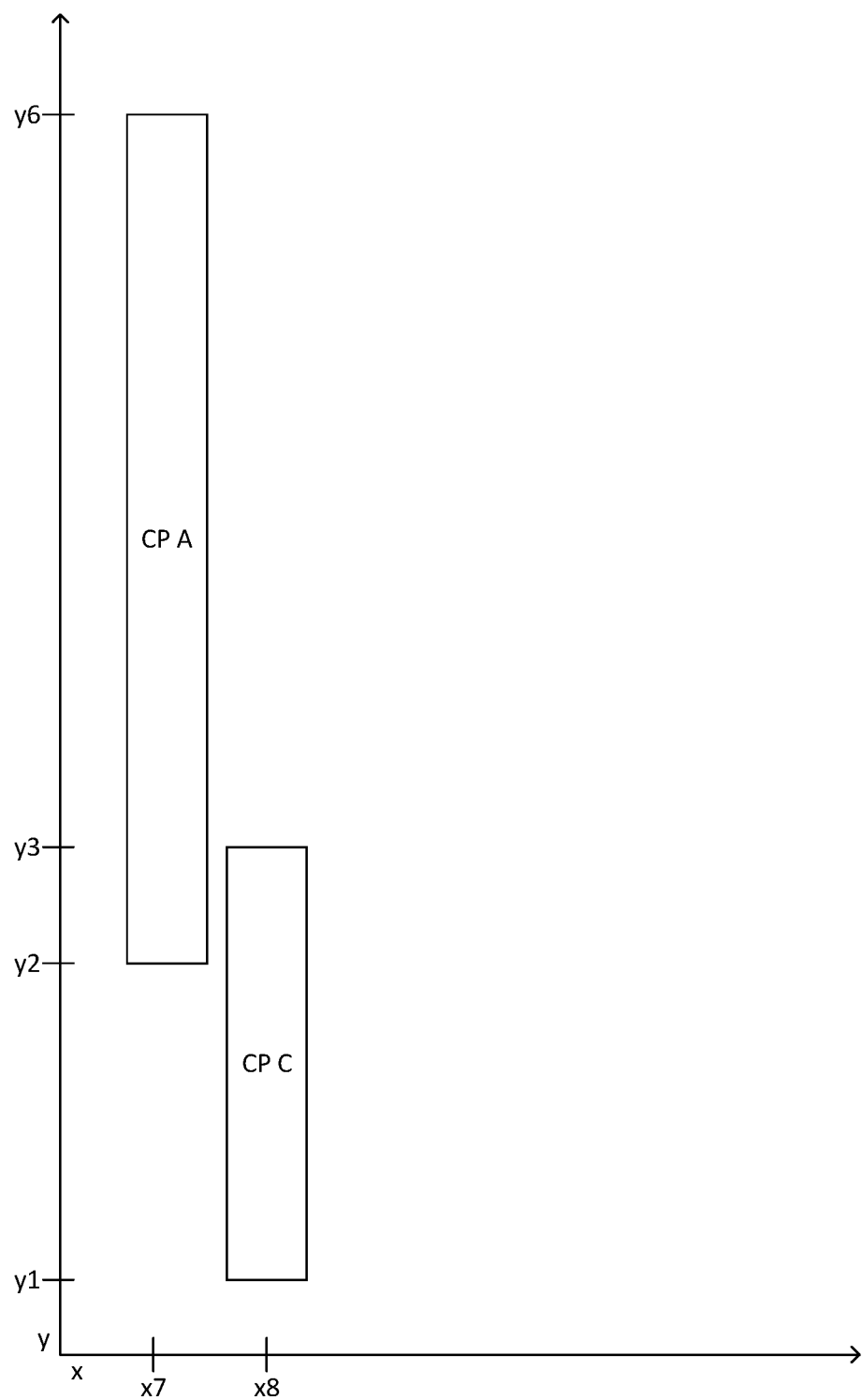
FIG. 9 illustrates closely placed narrow columns of text, according to certain embodiments.

The check at 630 for whether the current CP overlaps in Y with the CP's predecessor can prevent errors that might otherwise occur in cases involving very narrow, closely spaced columns. FIG. 9 illustrates closely placed narrow columns of text, according to certain embodiments. As shown in FIG. 9, CP A may range in y from y2 to y6, while CP C may range in y from y1 to y3. If absolute numbers of pixels or points are used, the x-midpoint of CP A, x7, may be close to x-midpoint of CP C, x8. By excluding CP C from being considered based on y-overlap, the close proximity of x7 and x8 may not cause CP C to be treated as being in the same column as CP A.

Rather than checking a given candidate paragraph only against an immediate predecessor candidate paragraph, each given candidate paragraph can be checked against every preceding candidate paragraph on a given page. The creation of a new column at 640 may then occur only if the current candidate paragraph either overlaps in Y with every previous candidate paragraph, or does not have an x-midpoint roughly equal to the x-midpoint of any of the preceding candidate paragraphs.

Figure 10:
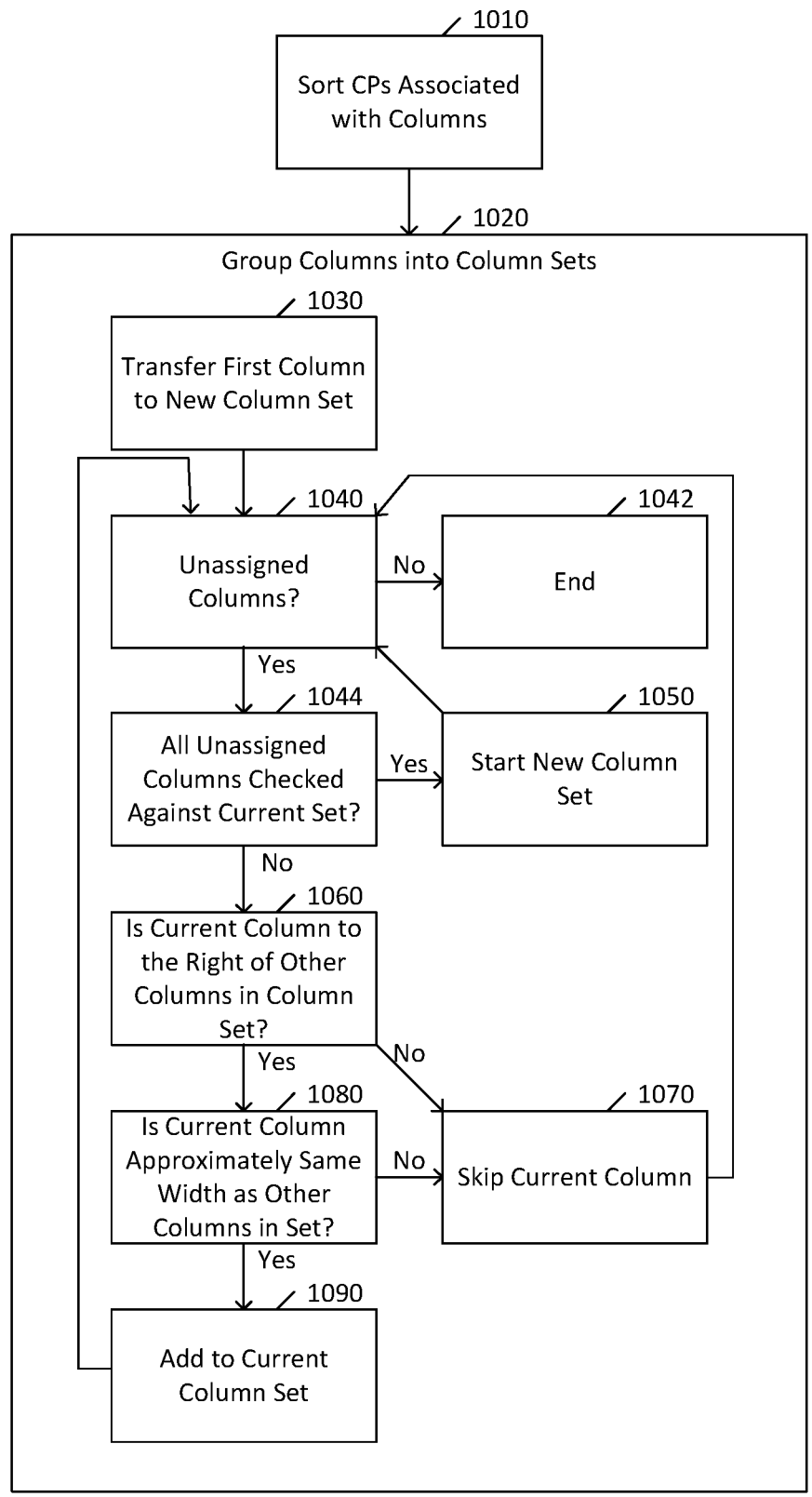
FIG. 10 illustrates a method of column handling, according to certain embodiments.

FIG. 10 illustrates a method of column handling, according to certain embodiments. As shown in FIG. 10, a method can begin at 1010 by sorting each CP in each column from top to bottom, considering each CP's topmost point. The CPs may have been associated with a given column using the method described above, or any other suitable method.

The method can also include, at 1020, grouping columns into column sets. A column set can be a collection of columns that go together. By identify which columns go together and which do not, the method may be prevented from trying to span paragraphs across columns that do not go together.

At 1030, the method can include transferring the first column into a new column set. The method can include checking, at 1040, whether there are unassigned columns. If there are no unassigned columns, then at 1042, the process can end. Next, at 1044, the method can include confirming whether all unassigned columns have been checked against a current column set. If so, then a new column set can be started at 1050 based on a first one of the remaining unassigned columns. If there are unassigned columns that have not been checked against a current set, a next one of the unassigned columns in a queue of unassigned columns can be considered at 1060.

While there are unassigned columns, for all unassigned columns, the column may be added to the current column set at 1090, if the current column set is empty, namely if a new column set is being created at 1050, or if the current column is determined at 1060 to be to the right of all of the other columns currently in the current column set, and the current column's width is determined at 1080 to be roughly equal to the average column width in the column set. Otherwise, at 1070, the method can skip over the current column, removing it from a queue of current columns to be considered from a current column set, but maintaining the column to be assigned to a later column set.

If there are still unassigned columns and the current column set for consideration is empty, then at 1050 a new column set can be formed.

Skipping over columns at 1070 if they do not seem to belong to the current column set may provide benefits. Columns in the same column set may be separated in x-midpoint by columns that are not in the same column set. FIG. 7 provides an illustration of a case where CP E1 and CP E2 may be candidate paragraphs in two different columns of the same column set. On the other hand, CP D may be a candidate paragraph in an unrelated column that has an x-midpoint, x8, between the x-midpoints of CP E1 and CP E2, X7 and x9, respectively.

Figure 11:
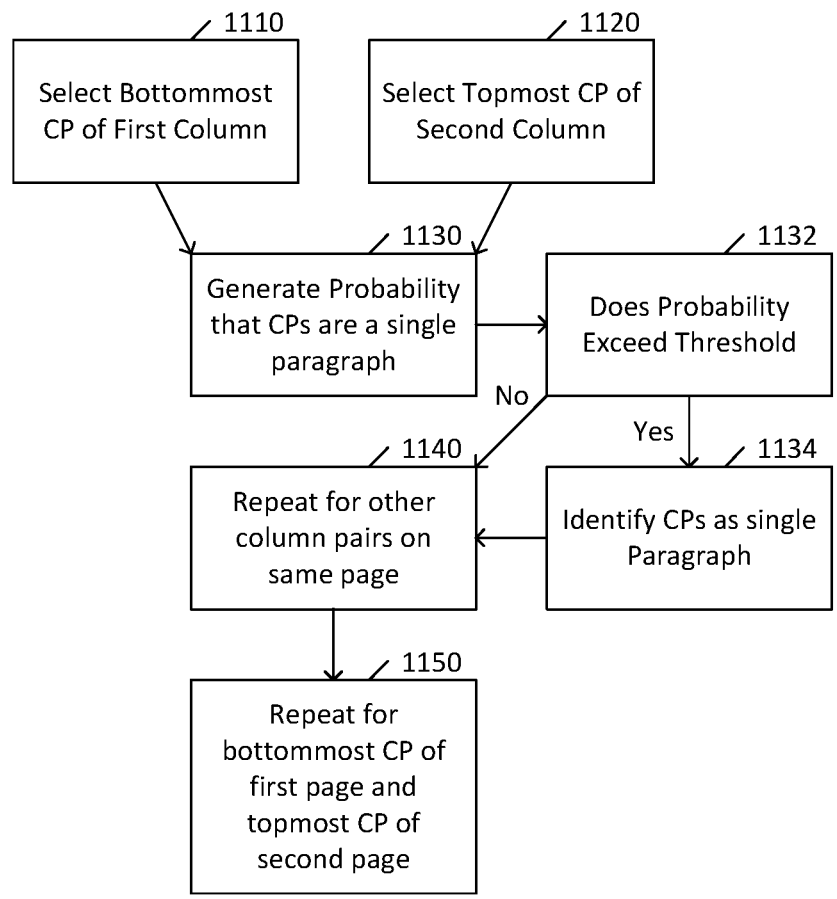
FIG. 11 illustrates an example of testing for spanning paragraphs, according to certain embodiments.

FIG. 11 illustrates an example of testing for spanning paragraphs, according to certain embodiments. As shown in FIG. 11, a method can include, at 1110, selecting a bottommost paragraph of a first column of a given column set, and, at 1120, selecting a topmost paragraph of a second column in the column set. The method can also include, at 1130, generating a probability, for example from 0 to 1, the two candidate paragraphs are actually two parts of the same paragraph. There is more discussion of this aspect below.

If the probability is determined at 1132 to exceed a threshold, for example 0.85, then at 1134 the two CPs can be identified as two parts of the same paragraph. The same procedure can be repeated at 1140 for other column pairs on the same page, and for one or more bottommost CP on a first page and one or more topmost CP on a second page, at 1150.

There may be other ways of accomplishing the same objective for page-spanning paragraphs. For example, the CPs may be arranged as a list, and then removed from the list if a given CP has characteristics making the given CP highly unlikely to be part of a page-spanning paragraph. For example, CPs may be removed if the CPs have very few words, for example fewer than two words, very few characters, for example fewer than ten characters, or if the CPs are only digits or whitespace. In some older books, a linking phrase may be provided to the bottom of the final paragraph on a given page, which can then appear as the first phrase of the starting paragraph on the next page. If such a signal is present in the document, a more direct association may be made between the last CP on the first page and the first CP of the second. The repeated phrase on the first page may not be treated as a separate paragraph in this case.

In case it is not clear from signals on the page or the like which CP on a second page is verbally linked to a corresponding CP on the first page, then for each pair of consecutive pages, a probability can be generated for every pair of CPs, one CP from a first page and the other CP from the second page. The CPs in the list can exclude highly unlikely candidates. This can be a performance optimization to prevent repeated consideration of those poor candidates.

In certain academic literature, there may be more than one paragraph spanning between pages. For example, a footnote on the first page may span to the second page, and at the same time a paragraph of the main body text can span from the first page to the second page. Likewise, in diglot or other polyglot literature, paragraphs in parallel languages may each span pages. The method may take into account whether such academic and/or polyglot situations are suitable for the analysis. In case such exceptional situations are not to be considered, the method may simply select the pair of candidate paragraphs with the highest probability of being a spanning paragraph. If the highest probability exceeds a threshold, such as 85%, then CPs of the pair can be identified as two parts of the same paragraph.

Various techniques can be used to remove non-MBT text from consideration. For example, CPs can be removed from a list of MBT CPs if the CP is clearly above where MBT would typically start, such as in the header area, or clearly below where the MBT would typically end, such as in the footer area. Likewise, if the CP is within a bounding box of a containing object, such as a table, textbox, or callout, the CP can be removed. In certain cases, opposing pages of a document may be typeset to be read as a single page. This technique is sometimes found in children's books, but may be found in other contexts. In case of such typesetting, two opposing pages can be considered as a single unified page. In such a case, the CPs may themselves have an x range that begins on a left side of the unified page and ends on the right side of the unified page.

Various techniques can be used to generate the column spanning probability at 1130 in FIG. 11. Given a first CP from the bottom of a column and second CP from the top of a subsequent column, a probability [0,1] can be generated that the two CPs are actually two parts of the same paragraph.

The probability may be deemed to be 0 or very low, if the paragraphs have few words, such as two or fewer, few characters, such as 10 or fewer, or have only numeric data or whitespace.

The probability may be deemed to be 0 or very low if the two candidate paragraphs overlap to any degree in x. An overlap in x can indicate that the two candidate paragraphs may not really reside in distinct columns in the same column set. This is a possibility because the column and column set inferencing heuristics may be imperfect.

A lower probability may be assigned when the first candidate paragraph appears to be terminated with a period or period followed by a quotation mark, and a still lower probability when the first candidate paragraph appears to be terminated with an exclamation point or question mark, either alone or followed by a quotation mark.

A higher probability may be assigned when the first candidate paragraph appears to end without terminal punctuation, or with a terminal comma, semicolon, or colon.

A lower probability may be assigned when the second candidate paragraph appears to begin with a capital letter, or a quotation mark and a capital letter. A higher probability may be assigned when the second candidate paragraph appears to begin with a lowercase letter, an open parenthesis, an open bracket, or the like.

These are examples that are based on using modern English conventions. A language setting or a determination from language processing at 110 in FIG. 1 may determine the appropriate scoring to use.

Other considerations may also be taken into account. For example, the degree to which the text character stylings of the two paragraphs are similar can be determined. The character stylings can include apparent font selection, font size, bold, italic, underline, or the like. For example, in the case of the academic papers with footnotes that continue from one page to the next, the footnotes may be associated with another and distinguished from the main text by font size and not only by page position.

The language processing at 110 in FIG. 1 can also entail a natural language processing (NLP) analysis. For example, pairs of CPs can be scored based on a degree to which A and B seem to be concerned with the same topic, have the same writing style, are written at the same writing level, or the like.

Other factors can also be considered. The total score of all such weightings can be transformed into a probability by applying a non-linear mapping function such as a logistic function.

In the case of potential page spanning paragraphs, the same probability analysis can be performed. Additional weight can be added to the most bottom right MBT CP on the first page and the most top left MBT CP on the second page. Moreover, the weight can be increased or decreased based on how close or far the positioning of the CP is to the bottom right corner of the MBT on the first page and to the top left corner of the MBT on the second page.

Similarly, the score can be increased when a given CP on the first page is a member of the bottom MBT border, and likewise when a given CP on the second page is a member of the top MBT border.

The score can also be increase based on how ideally a given CP is located within a column set. For example, the ideal location for a CP on the first page may be at the right edge of the column set, and the ideal location for a CP on the second page may be at the left edge of the column set.

The inverse may also be used to decrease score. If there are more ideally located columns in either column set, the score for a given pair may be reduced. Likewise, if there are more ideally located CPs in the ideal columns, the score may be reduced.

Another factor that may be considered is a degree to which the last line of a first candidate paragraph extends to the right edge of the candidate paragraph's bounding box. The closer the end of the line is to the edge of the bounding box, the higher the score. If the line ends well before the edge of the paragraph, it may be less likely that the paragraph continues to the next candidate paragraph. If the amount of white space in the last line is longer than a first word in the potential paired candidate paragraph, then the score can be further reduced, while if the first word of the potential paired candidate paragraph is longer than the amount of white space in the last line, then the score may be increased.

All the other factors mentioned for paragraphs within a page can also be used for paragraphs on separate pages. The total score can be transformed into a probability by applying a non-linear mapping function such as a logistic function.

Figure 12:
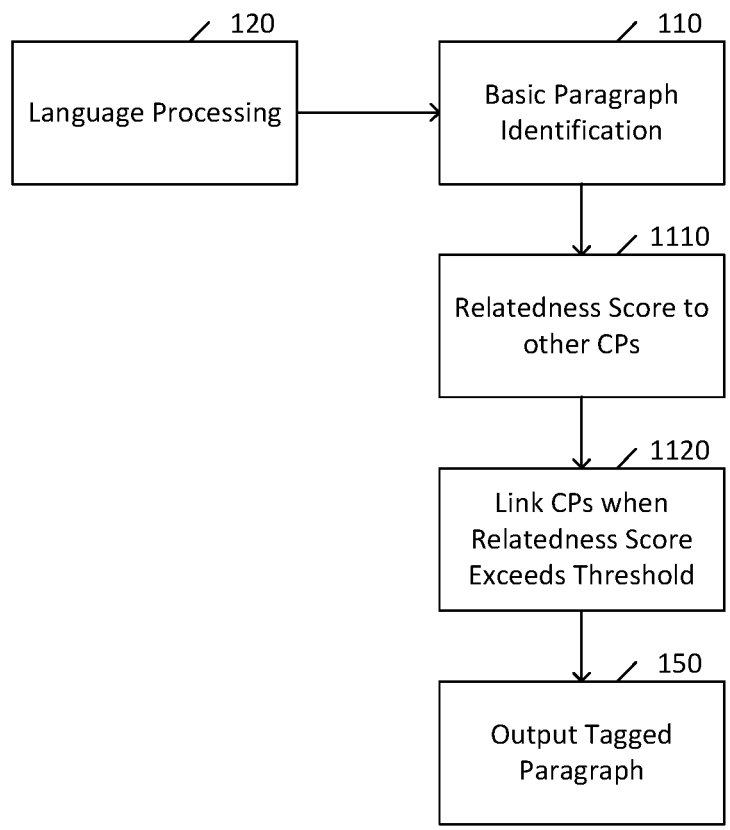
FIG. 12 illustrates a method according to certain embodiments.

FIG. 12 illustrates a method according to certain embodiments. The method of FIG. 12 may be similar to the method of FIG. 1, in that the method may begin with language processing 120 of a document, which may then proceed to basic paragraph identification at 110. In this example, however, the method may proceed by generating a relatedness score of each candidate paragraph on a given page to every other candidate paragraph on the same page and/or to every other candidate paragraph on the next page of the document. The relatedness score may be based on the way that each candidate paragraph starts and ends. For example, when a paragraph ends without punctuation, or a paragraph begins without a capital letter, it may be given a higher relatedness score. The relatedness score can include running a grammar check against a hypothetical paragraph formed by concatenating a first candidate paragraph with a second candidate paragraph. If the hypothetical paragraph has no grammar errors, the relatedness score may be higher, and if the hypothetical paragraph has grammar errors, the relatedness score may be lower. Likewise, the relatedness score of a candidate paragraph may be higher as a starting paragraph of a pair, when the candidate paragraph ends with no or only a small amount of blank space from the last character to the right edge of a bounding box of the paragraph. By contrast, the relatedness score of the paragraph may be lower as a starting paragraph of a pair when the last line of the paragraph ends far from the right edge of the bounding box of the paragraph.

The relatedness score can also take into account the relative position of the paragraphs on the page. For example, a paragraph pair may have a relatively lower score when a speculative first paragraph of the pair is to the right of the speculative second paragraph of the pair.

The relatedness score can further take into account the relative dimensions of the paragraphs. For example, when paragraphs have approximately the same widths, their relatedness score may be higher, whereas when the paragraphs have more than 50% difference in width, their relatedness score may be lower.

Other factors are also permitted. Optionally, average and variance of paragraph length of the document can be calculated. Paragraphs that are more than one standard deviation shorter than average may be given a higher relatedness score.

At 1120, CPs can be linked when the relatedness score exceeds a threshold. The relatedness score can be expressed as a probability or a raw score. A confidence of 85% may be used when linking paragraphs. For a given page, if the relatedness score produces a confidence exceeding 50% for multiple conflicting pairs of paragraphs, linking can be skipped. Linked CPs can be tagged as a single paragraph.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components that, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a controller, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

I claim:

1. A computer-implemented method, comprising:
   using a computer, obtaining a set of candidate paragraphs for an electronic document;
   using a computer, from the set of candidate paragraphs, identifying a pair of candidate paragraphs that together span either consecutive columns on a page of the electronic document or columns on consecutive pages of the electronic document, wherein the pair of candidate paragraphs comprise a first candidate paragraph from a first column and a second candidate paragraph from a second, different column;
sorting the pair of candidate paragraphs by x-midpoint and adding one of the set of candidate paragraphs into one of the first and second columns based on an x-midpoint of the added one of the set of candidate paragraphs and a y-overlap of the added one of the set of candidate paragraphs with another in the set of candidate paragraphs;
responsive to determining whether the x-midpoints are within a certain number of pixels of each other or a certain percentage of width of the pair of candidate paragraphs, positioning the second candidate paragraph in the second column or adding the second candidate paragraph to the first column;
wherein the identifying the pair of candidate paragraphs comprises determining whether a final candidate paragraph from the set of candidate paragraphs, of the first column continues to a first candidate paragraph from the set of candidate paragraphs, of the second column; and
using a computer, outputting a tagged paragraph made of the pair of candidate paragraphs.

2. The method of claim 1, further comprising:
excluding one of the set of candidate paragraphs from the identifying when the one of the set of candidate paragraphs is determined not to be main body text of the electronic document.

3. The method of claim 2, wherein each candidate paragraph in the set of candidate paragraphs includes a bounding box, and wherein the obtaining comprises finding a union of the bounding boxes after the excluding, wherein the union is a bounding box of the main body text.

4. The apparatus of claim 3, wherein each candidate paragraph in the set of candidate paragraphs includes a bounding box, and wherein the obtaining comprises finding a union of the bounding boxes after the excluding, wherein the union is a bounding box of the main body text.

5. A non-transitory computer-readable medium encoded with instructions that, when executed in hardware, perform a method comprising:
obtaining a set of candidate paragraphs for an electronic document;
from the set of candidate paragraphs, identifying a pair of candidate paragraphs that together span either consecutive columns on a page of the electronic document or columns on consecutive pages of the electronic document, wherein the pair of candidate paragraphs comprise a first candidate paragraph from a first column and a second candidate paragraph from a second, different column;
sorting the pair of candidate paragraphs by x-midpoint and adding one of the set of candidate paragraphs into one of the first and second columns based on an x-midpoint of the added one of the set of candidate paragraphs and a y-overlap of the added one of the set of candidate paragraphs with another in the set of candidate paragraphs;
responsive to determining whether the x-midpoints are within a certain number of pixels of each other or a certain percentage of width of the pair of candidate paragraphs, positioning the second candidate paragraph in the second column or adding the second candidate paragraph to the first column;
wherein the identifying the pair of candidate paragraphs comprises determining whether a final candidate paragraph from the set of candidate paragraphs, of the first column continues to a first candidate paragraph from the set of candidate paragraphs, of the second column; and
outputting a tagged paragraph made of the pair of candidate paragraphs.

6. The non-transitory computer-readable medium of claim 5, the method further comprising:
excluding one of the set of candidate paragraphs from the identifying when the one of the set of candidate paragraphs is determined not to be main body text of the electronic document.

7. The apparatus of claim 6, wherein each candidate paragraph in the set of candidate paragraphs includes a bounding box, and wherein the obtaining comprises finding a union of the bounding boxes after the excluding, wherein the union is a bounding box of the main body text.

8. An apparatus, comprising:
at least one processor; and
at least one memory including computer program code,
wherein the at least one memory and the computer program code are configured to, with the at least one processor, cause the apparatus to perform a method comprising:
obtaining a set of candidate paragraphs for an electronic document;
from the set of candidate paragraphs, identifying a pair of candidate paragraphs that together span either consecutive columns on a page of the electronic document or columns on consecutive pages of the electronic document, wherein the pair of candidate paragraphs comprise a first candidate paragraph from a first column and a second candidate paragraph from a second, different column;
sorting the pair of candidate paragraphs by x-midpoint and adding one of the set of candidate paragraphs into one of the first and second columns based on an x-midpoint of the added one of the set of candidate paragraphs and a y-overlap of the added one of the set of candidate paragraphs with another in the set of candidate paragraphs;
responsive to determining whether the x-midpoints are within a certain number of pixels of each other or a certain percentage of width of the pair of candidate paragraphs, positioning the second candidate paragraph in the second column or adding the second candidate paragraph to the first column;
wherein the identifying the pair of candidate paragraphs comprises determining whether a final candidate paragraph from the set of candidate paragraphs, of the first column continues to a first candidate paragraph from the set of candidate paragraphs, of the second column; and
outputting a tagged paragraph made of the pair of candidate paragraphs.

9. The apparatus of claim 8, the method further comprising:
excluding one of the set of candidate paragraphs from the identifying when the one of the set of candidate paragraphs is determined not to be main body text of the electronic document.

* * * * *